US012600073B2

(12) United States Patent
Stefano et al.

(10) Patent No.: US 12,600,073 B2
(45) Date of Patent: Apr. 14, 2026

(54) APPARATUS FOR ADJUSTING THE THICKNESS OF A RESIN FILM EXITING AN EXTRUSION LIP OF A BLOWN FILM EXTRUDER

(71) Applicant: Electronic Systems S.p.A., Momo (IT)

(72) Inventors: Trizzino Stefano, Momo (IT); Martena Florinda, Momo (IT)

(73) Assignee: ELECTRONIC SYSTEMS S.P.A., Momo Novara (IT)

( * ) Notice: Subject to any disclaimer, the term of this patent is extended or adjusted under 35 U.S.C. 154(b) by 0 days.

(21) Appl. No.: 18/145,353

(22) Filed: Dec. 22, 2022

(65) Prior Publication Data

US 2023/0202091 A1    Jun. 29, 2023

(30) Foreign Application Priority Data

Dec. 23, 2021    (EP) .................................... 21217435

(51) Int. Cl.
   *B29C 48/325*        (2019.01)
   *B29C 48/10*         (2019.01)
   (Continued)

(52) U.S. Cl.
   CPC ............ *B29C 48/325* (2019.02); *B29C 48/10* (2019.02); *B29C 48/2526* (2019.02);
   (Continued)

(58) Field of Classification Search
   CPC . B29C 48/10; B29C 48/2526; B29C 48/2528; B29C 48/325; B29C 48/327;
   (Continued)

(56) References Cited

U.S. PATENT DOCUMENTS 2,769,200 A * 11/1956 Longstreth ............ B29C 48/313
                                                                 425/466
3,079,636 A *  3/1963 Aykanian ............ B29C 48/0017
                                                                 264/53
(Continued)

FOREIGN PATENT DOCUMENTS

CN      106 926 440 B      11/2018
DE       41 06 487 C1      2/1992
(Continued)

OTHER PUBLICATIONS

English translation of DE 4239270 May 26, 1994. (Year: 1994).*

*Primary Examiner* — Xiao S Zhao
*Assistant Examiner* — Joseph S Leyson
(74) *Attorney, Agent, or Firm* — Simpson & Simpson, PLLC; Jeffrey B. Powers

(57)        ABSTRACT

The invention provides an appartus for adjusting the thickness of a resin film exiting an extrusion lip of a blown film extruder, the apparatus comprising: a gear motor configured to provide a rotational movement in any one of two directions; an actuation unit connected with a first side to the gear motor and with a second side to the extrusion lip, wherein the actuation unit is configured to convert the rotational movement of the gear motor into an axial movement, and wherein the actuation unit is further configured to adjust a local width of the extrusion lip by the axial movement for adjusting the thickness of the resin film exiting the extrusion lip of the blown film extruder.

12 Claims, 3 Drawing Sheets

(51) Int. Cl.
  _B29C 48/25_     (2019.01)
  _B29C 48/92_     (2019.01)
(52) U.S. Cl.
  CPC .......... _B29C 48/2528_ (2019.02); _B29C 48/92_
    (2019.02); _B29C 2948/92152_ (2019.02); _B29C_
      _2948/92447_ (2019.02); _B29C 2948/92647_
        (2019.02); _B29C 2948/92904_ (2019.02)
(58) Field of Classification Search
  CPC .......... B29C 48/92; B29C 2948/92152; B29C
      2948/92647; B29C 2948/92904
  See application file for complete search history.

(56) References Cited

U.S. PATENT DOCUMENTS 3,535,739 A * 10/1970 Gottfried ............. B29C 48/325
                                                  425/141

4,124,351 A * 11/1978 Garbuio ................ B29C 48/272
                                                  425/532
4,741,686 A * 5/1988 Cazzani ................. B29C 48/07
                                                  425/381
5,110,518 A * 5/1992 Halter ................... B29C 48/325
                                                  425/141
5,691,908 A * 11/1997 Adamy ................... B29C 48/92
                                                  702/170
2017/0341286 A1   11/2017 Shimokawa et al.
2018/0264704 A1* 9/2018 Nakano ................... B29C 48/92

FOREIGN PATENT DOCUMENTS

DE      4239270 A1 * 5/1994   ............. B29C 47/16
EP      3 381 650 A1  10/2018
JP      H09 225995 A   9/1997

* cited by examiner

S10 providing a rotational movement in any one of two directions

S20 convert the rotational movement into an axial movement

S30 adjust a local width of the extrusion lip by the axial movement for adjusting the thickness of the resin film exiting the extrusion lip of the blown film extruder

APPARATUS FOR ADJUSTING THE THICKNESS OF A RESIN FILM EXITING AN EXTRUSION LIP OF A BLOWN FILM EXTRUDER

REFERENCE TO RELATED APPLICATION

This application claims benefit of priority of European Patent Application Number 21 217 435.3, filed on Dec. 23, 2021, which is hereby incorporated by reference herein in its entirety.

FIELD

The present disclosure relates to appartus, systems and methods for adjusting the thickness of a resin film exiting an extrusion lip of a blown film extruder.

BACKGROUND

Blown film extrusion is a continuous process in which the polymer is melted. The melted polymer is forced through an anular die, and the resulting tube is inflated with air into a "bubble" and cooled.

If stationary dies are used, a subsequent step is required to spread any gauge non-uniformities across the rolls. Such steps may involve oscillating nips and rotating take offs.

The rotating, oscillating take-offs after the collapsing frame have the purpose to spread bands with thicker gauges around the circumference so that an accumulation of the material in one place, which leads to a heavier band on the wind-up roll is eliminated. This, however, requires high mechanical maintenance and a web guide side to balance out the displacement.

In addition, electrical resistors may be built into the die to fine tune the control of thickness bands and cooling units may be used at the outlet (blower and air ring) for stabilizing the film. As the resin is heated and exits the die as a viscous melt, the cooling unit is not only necessary for cooling the film bubble but also to improve flatness of the film while stabilizing it.

The aforementioned state of the art has many disadvantages such as the complexity of oscillating take-offs, late response time of stabilizing/control devices such as electrical resistors and the air ring as well as their low accuracy.

SUMMARY

It is an object of the present invention to overcome the aforementioned deficiencies of the prior art and to provide appartus, systems and methods for adjusting the thickness of a resin film exiting an extrusion lip of a blown film extruder. The object is achieved with the features of the independent claims. Dependent claims define preferred embodiments of the invention.

In particular, the present disclosure relates to an appartus for adjusting the thickness of a resin film exiting an extrusion lip of a blown film extruder, the apparatus comprising: a gear motor configured to provide a rotational movement in any one of two directions; an actuation unit connected with a first side to the gear motor and with a second side to the extrusion lip, wherein the actuation unit is configured to convert the rotational movement of the gear motor into an axial movement, and wherein the actuation unit is further configured to adjust a local width of the extrusion lip by the axial movement for adjusting the thickness of the resin film exiting the extrusion lip of the blown film extruder.

Various embodiments may preferably implement the following features.

Preferably, the extrusion lip is provided as one continuous lip and has a circular shape.

Preferably, the appartus further comprises a mechanical joint connected between the actuation unit and the extrusion lip.

Preferably, the actuation unit comprises a threaded shaft and at least one hinge, preferably two hinges.

Preferably, the hinge(s) transmit(s) the axial movement allowing and providing mechanical clearances (backlashes) such that the device is less rigid.

Most preferably, there is provided one hinge, which provides the best compromise between optimal transmission and limited mechanical clearances.

Preferably, the threaded shaft is connected to the gear motor and the at least one hinge is connected between the threaded shaft and the extrusion lip.

Preferably, the at least one hinge is connected to the extrusion lip via the mechanical joint.

Preferably, the actuation unit comprises a threaded shaft, a hinge and an adjustable rod.

Preferably, the threaded shaft is connected to the gear motor and the hinge, wherein the hinge is connected to the adjustable rod and wherein the adjustable rod is connected to the extrusion lip.

Preferably, the adjustable rod is connected to the extrusion lip via the mechanical joint.

The adjustable rod may facilitate the assembly and mounting of the device. That is, using one or more adjustable rods allows for an improved assembly and mounting of the device within the blown film extruder and in particular assembly and mounting the device to the extrusion lip.

Preferably, the apparatus further comprises a processor, wherein the processor is configured to automatically control the gear motor to adjust the local width of the extrusion lip by the axial movement for adjusting the thickness of the resin film to a predetermined thickness, preferably to adjust the thickness of the resin film to be essentially uniform throughout the entire circumference of the extrusion lip.

Preferably, the action of the apparatus, due to the action of the gear motor and the transmission units (actuation unit, mechanical joint), modifies (controls) the exit clearance of the extrusion lip, and therefore modifies the thickness of the film.

Preferably, the gear motor is configured to act by a push/pull device on the lip clearance to control the thickness of the resin that exits the die.

Preferably, the apparatus further comprises at least one gauge, preferably at least one rotating gauge, wherein the at least one gauge is configured to measure the film thickness around the blown film, and wherein the processor is configured to automatically control the gear motor based on the measured film thickness.

Preferably, the processor is further configured to automatically control the gear motor based on an incremental offset distributed as stochastic noise, preferably at an average equal to zero.

Preferably, the processor is further configured to automatically control the gear motor based on an incremental offset (added or subtracted to the received offset) distributed as stochastic noise (therefore at average equal to zero) to allow to spread bands with different gauges around the circumference and, therefore, allowing the take-off to be stopped or eliminated. That is, the take-off (rollers are used to provide take-off, rotation and collapsing of the bubble) that mechanically spreads thicker bands around the circumference by rotation may be stopped or eliminated by the use of the apparatus/method described herein.

Preferably, the apparatus further comprises a base ring having two guide protrusions connected thereto, wherein the apparatus is fixedly located between the two guide protrusions.

Preferably, the base ring has a circular shape having a diameter greater than the diameter of the extrusion lip and the base ring extends in a plane perpendicular to the extrusion direction of the extruded film.

Preferably, the two guide protrusions extend in a direction parallel to the extrusion direction of the extruded film from the base ring.

Preferably, the base ring may be a base plate.

The base ring (base plate) can be provided as part of the extrusion die or as a separate component that can be provided with the apparatus mounted on the extrusion lip.

The present disclosure also relates to a system for adjusting the thickness of resin film exiting an extrusion lip of a blown film extruder, the system comprising: an extrusion lip for a blown film extruder configured to create resin film of a predetermined thickness; and at least one of the above described apparatus.

Various embodiments may preferably implement the following features.

Preferably, the apparatus is provided in plurality around the circumference of the extrusion lip.

Preferably, the apparatus is provided at least 10 times, more preferably at least 20 time and most preferably at least 30 times around the circumference of the extrusion lip.

Preferably, one apparatus is assigned a sector of the extrusion lip upon which the apparatus is configured to act upon, i.e. to adjust the local width of said sector.

The present disclosure also relates to a method for adjusting the thickness of a resin film exiting an extrusion lip of a blown film extruder, the method comprising: providing a rotational movement in any one of two directions; convert the rotational movement into an axial movement; and adjust a local width of the extrusion lip by the axial movement for adjusting the thickness of the resin film exiting the extrusion lip of the blown film extruder.

Various embodiments may preferably implement the following features.

Preferably, adjusting the local width of the extrusion lip by the axial movement for adjusting the thickness of the resin film comprises automatically controlling the gear motor to adjust the local width of the extrusion lip by the axial movement for adjusting the thickness of the resin film to a predetermined thickness, preferably to adjust the thickness of the resin film to be essentially uniform throughout the entire circumference of the extrusion lip.

Preferably, automatically controlling the gear motor comprises measuring the film thickness by at least one gauge, preferably at least one rotating gauge, around the blown film and automatically controlling the gear motor based on the measured film thickness.

Preferably, automatically controlling the gear motor comprises controlling the gear motor based on an incremental offset distributed as stochastic noise, preferably at an average equal to zero.

The present disclosure also relates to a computer program product comprising a computer-readable program medium code stored thereupon, the code, when executed by a processor, causing the processor to implement any of the method steps described above.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

Figure 1:
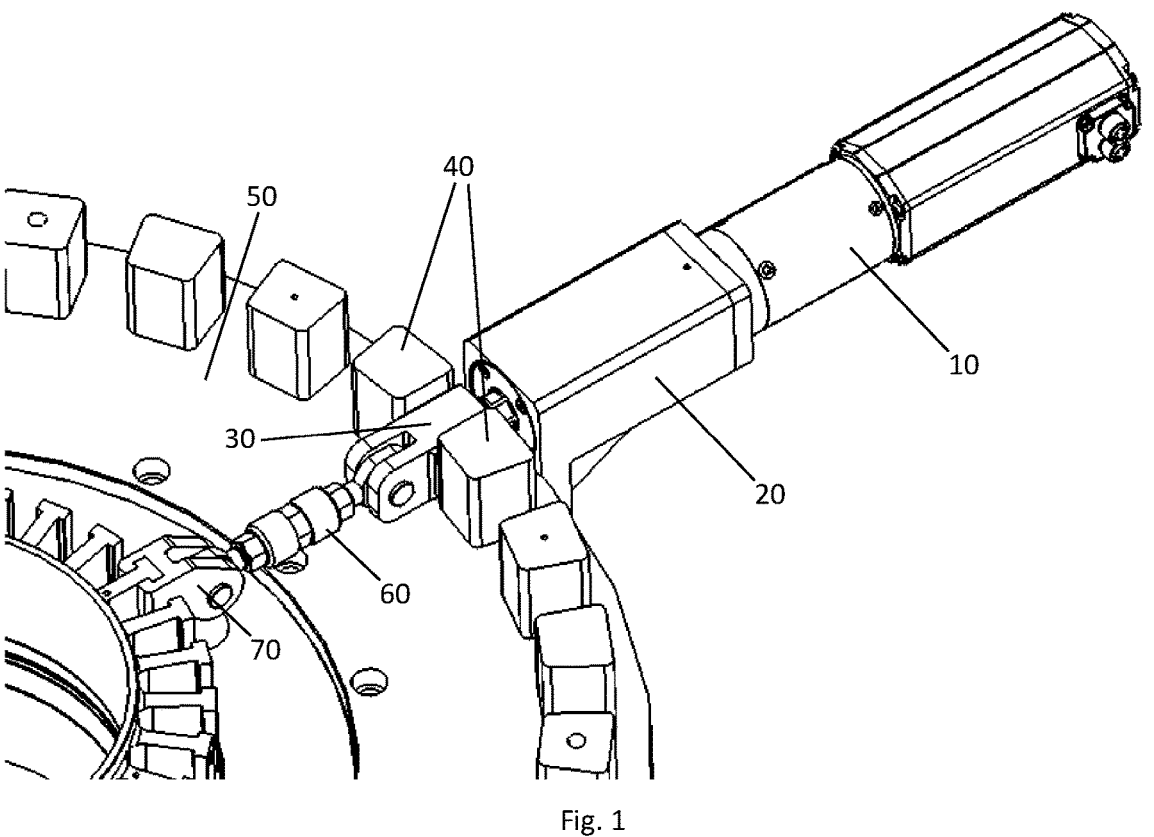
FIG. 1 is a schematic illustration of a system for adjusting the thickness of a resin film exiting an extrusion lip of a blown film extruder according to an embodiment.

FIG. 1 shows a system for adjusting the thickness of a resin film exiting an extrusion lip of a blown film extruder. The system comprises an apparatus for adjusting the thickness of a resin film exiting an extrusion lip of a blown film extruder according to an embodiment. The apparatus comprises three units: a gear motor 10, an actuation unit 20 and a die-lip's push-pull joint (mechanical joint) 30.

The gear motor 10 rotates clockwise or counterclockwise, according to the direction along which the adjustment is required, to work on a specific section of the lip. The section on which a specific adjustment is to be performed by the apparatus may be predefined. That is, the single circular extrusion lip may be subdivided in a predetermined number of sections. Each section may then be provided with one apparatus. Each apparatus may individually adjust the respective section assigned to it.

That is, although only one apparatus for adjusting the thickness of a resin film exiting an extrusion lip of a blown film extruder is shown in FIG. 1, a plurality of such apparatus may be provided around the circumference of the extrusion lip, each acting on a different sector of the extrusion lip as described above.

The actuation unit 20 converts the torque from the gear motor 10 into an axial force through a threaded shaft combined with a slider (hinge) 30. The hinge transmits axial movement and providing mechanical clearances (backlashes) such that the device is less rigid. Preferably there is one hinge, because this may be the best compromise between optimal transmission and limited mechanical clearances. Alternatively, two hinges may be provided.

The apparatus is provided with a base plate 50. The base plate 50 has a circular shape having a diameter greater than the diameter of the extrusion lip and the base plate (or base ring) 50 extends in a plane perpendicular to the extrusion direction of the extruded film. The base plate 50 is located around the extrusion lip.

The base plate 50 can be part of the extrusion die or a separate component that can be provided with the apparatus and subsequently mounted on the extrusion lip.

The base plate 50 has several guide protrusions 40 firmly anchored with the base ring 50, wherein the apparatus is located in between two guide protrusions 40 to avoid any unwanted rotations under load. In case of a plurality of apparatus, each apparatus may be provided between two respective guide protrusions 40.

The guide protrusions 40 are provided on the base plate 50 along a circular path, preferably at or near the outer edge (edge located furthest away from the extrusion lip).

According to FIG. 1 an adjustable rod 60 is provided between the hinge 30 and a mechanical joint 70. The adjustable rod (tie rod) 60 is pushed when the hinge 30 moves forward. The adjustable rod 60 is pulled when the hinge 30 moves backward.

This double acting movement is provided to quickly transfer the load to the lip in both directions to thin or thicken gauges bands with immediate effect.

On the upper section of the die, just before the point where the melt flows out, said mechanical joint 70 is provided, which allows the push/pull rod 60 to work where the lip is more flexible for fine adjustments of the clearance.

Figure 2:
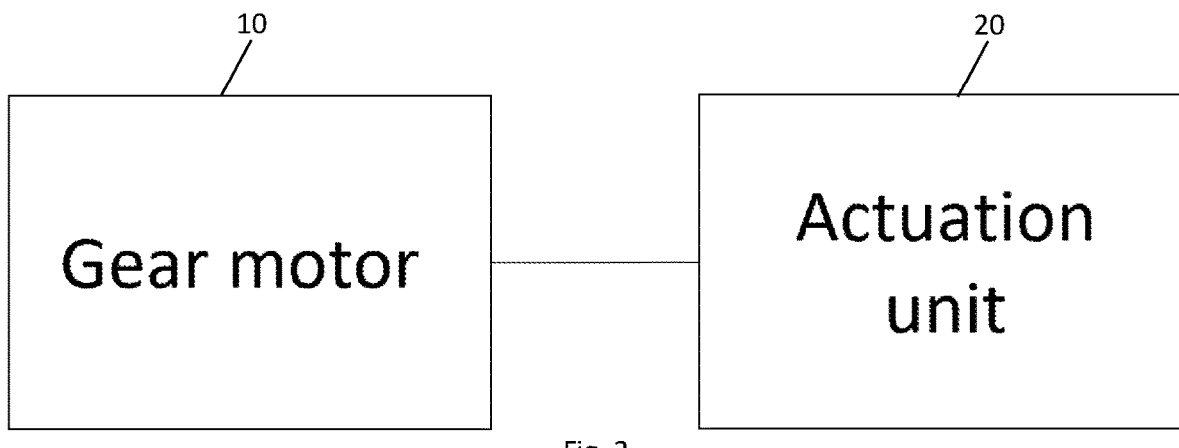
FIG. 2 is a schematic illustration of an apparatus for adjusting the thickness of a resin film exiting an extrusion lip of a blown film extruder according to an embodiment.

FIG. 2 is a schematic illustration of an apparatus for adjusting the thickness of a resin film exiting an extrusion lip of a blown film extruder according to an embodiment.

In an embodiment, the apparatus comprises: a gear motor 10 configured to provide a rotational movement in any one of two directions; an actuation unit 20 connected with a first side to the gear motor 10 and with a second side to the extrusion lip.

The actuation unit 20 is configured to convert the rotational movement of the gear motor 10 into an axial movement.

The actuation unit 20 is further configured to adjust a local width of the extrusion lip by the axial movement for adjusting the thickness of the resin film exiting the extrusion lip of the blown film extruder.

Figure 3A:
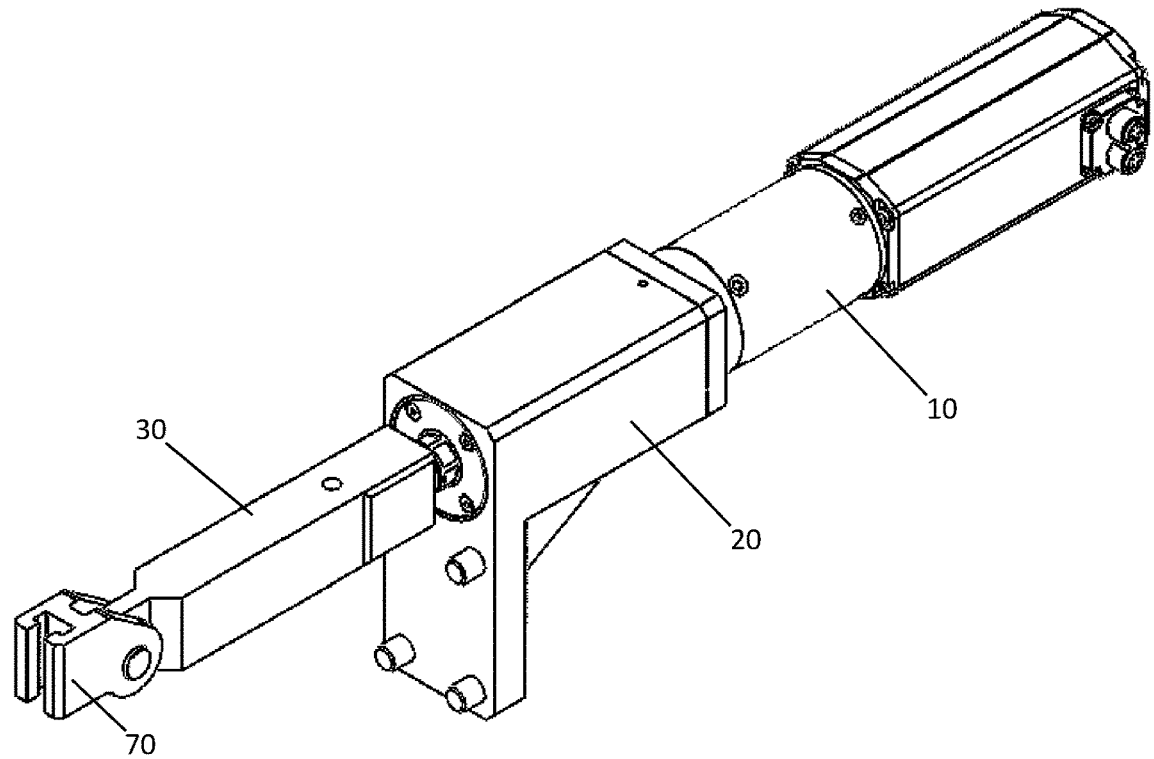
FIG. 3a is a schematic illustration of an appartus for adjusting the thickness of a resin film exiting an extrusion lip of a blown film extruder according to an embodiment.
Figure 3B:
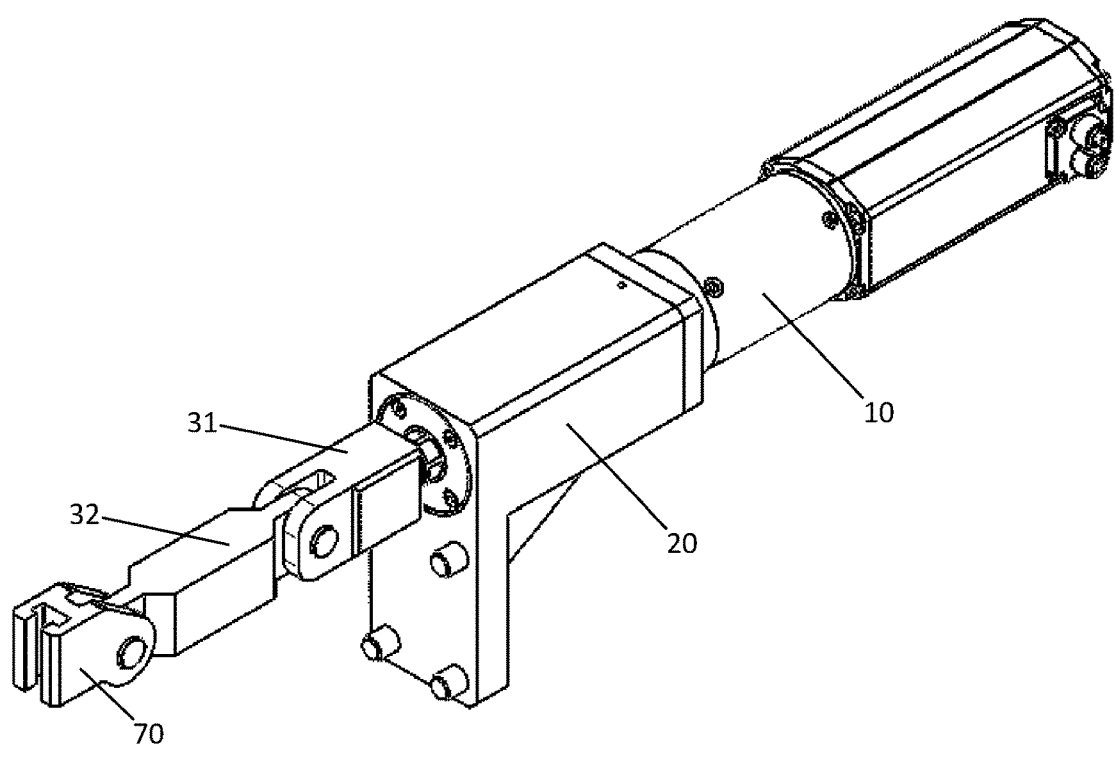
FIG. 3b is a schematic illustration of an appartus for adjusting the thickness of a resin film exiting an extrusion lip of a blown film extruder according to an embodiment.

FIGS. 3*a* and 3*b* illustrate alternative embodiments of the apparatus for adjusting the thickness of a resin film exiting an extrusion lip of a blown film extruder. The embodiments of FIGS. 3*a* and 3*b* differ from the embodiments of FIGS. 1 and 2 in that the actuation unit 20 comprises a single hinge 30 (FIG. 3*a*) connected between the mechanical joint 70 and the threaded shaft of the actuation unit 20 (without the adjustable rod 60 of FIG. 1).

In an alternative embodiment, according to FIG. 3*b*, two hinges 31 and 32 are provided instead of the single hinge 30 of FIG. 3*a*. The other components of the apparatus of FIGS.

3*a* and 3*b* correspond to the ones already described with reference to FIGS. 1 and 2 and will therefore not be repeated.

It is noted that the apparatus illustrated in FIG. 1 differs from the apparatus illustrated in FIG. 3*b* in that the second hinge 32 of FIG. 3*b* is replaced by the adjustable rod 60, wherein a length of the adjustable rod 60 may be adjusted. That is, the adjustable rod 60 is configured such that the length thereof can be adjusted.

Alternatively, according to an embodiment, two adjustable rods 60 (not shown) may be provided instead of the two hinges 31 and 32 illustrated in FIG. 3*b*.

According to embodiments described herein, fast time response and high accuracy is achieved, which allows to spread bands with different gauges around the circumference via automatic control (e.g. using a suitable software for said control) smoothly modifying the exit clearance by the gear motors and, therefore, allowing the take-off to be stopped or eliminated.

Figure 4:
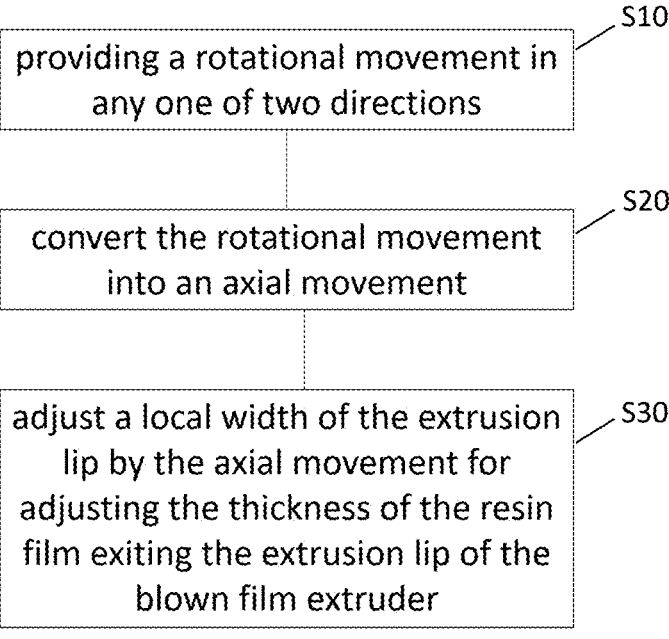
FIG. 4 is a flow chart illustrating a method for adjusting the thickness of a resin film exiting an extrusion lip of a blown film extruder according to an embodiment.

FIG. 4 is a flow chart illustrating a method for adjusting the thickness of a resin film exiting an extrusion lip of a blown film extruder according to an embodiment.

The method according to FIG. 4 comprises the following steps.

S10: providing a rotational movement in any one of two directions.

S20: convert the rotational movement into an axial movement.

S30: adjust a local width of the extrusion lip by the axial movement for adjusting the thickness of the resin film exiting the extrusion lip of the blown film extruder.

In an embodiment, adjusting the local width of the extrusion lip by the axial movement for adjusting the thickness of the resin film comprises automatically controlling the gear motor to adjust the local width of the extrusion lip by the axial movement for adjusting the thickness of the resin film to a predetermined thickness, preferably to adjust the thickness of the resin film to be essentially uniform throughout the entire circumference of the extrusion lip.

In an embodiment, automatically controlling the gear motor comprises measuring the film thickness by at least one gauge, preferably at least one rotating gauge, around the blown film and automatically controlling the gear motor based on the measured film thickness.

In an embodiment, automatically controlling the gear motor comprises controlling the gear motor based on an incremental offset distributed as stochastic noise, preferably at an average equal to zero.

In general, there may be two criteria for the adjustement of the extrusion lip and thus the adjustment of the thickness of the film. 1) Feedback on the gear motor actuator based on an actual thickness measurement taken by a rotating gauges around the blown film. 2) Action on the gear motor actuator based on an incremental offset (added or subtracted to the received offset) distributed as stochastic noise (therefore at average equal to zero) to allow to spread bands with different gauges around the circumference and, therefore, allowing the take-off to be stopped or eliminated.

The action of the apparatus, thanks to the action of the gear motor and the transmission units, modifies the exit clearance of the extrusion lip, and therefore modifies the thickness of the film.

In fact, the gear motor acts as a push/pull device on the lip clearance to control the thickness of the resin that exits the die.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. An apparatus for adjusting a thickness of a resin film exiting an extrusion lip of a blown film extruder, the apparatus comprising:

a gear motor configured to provide a rotational movement in either of two directions;

an actuation unit connected on a first side to the gear motor and on a second side to the extrusion lip; and a base ring having two guide protrusions connected thereto, the actuation unit being fixedly located between the two guide protrusions, wherein the actuation unit further comprises a threaded shaft, at least one hinge and an adjustable rod, wherein the threaded shaft is connected to the gear motor and the at least one hinge, wherein the at least one hinge is connected to the adjustable rod and wherein the adjustable rod is connected to the extrusion lip, wherein the actuation unit is configured to convert the rotational movement of the gear motor into an axial movement, and wherein the actuation unit is further configured to adjust a local width of the extrusion lip by the axial movement thereby adjusting the thickness of the resin film exiting the extrusion lip of the blown film extruder.

2. The apparatus of claim 1, wherein the at least one hinge is connected between the threaded shaft and the extrusion lip.

3. The apparatus of claim 1, further comprising a processor configured to automatically control the gear motor to adjust the local width of the extrusion lip by the axial movement for adjusting the thickness of the resin film to a predetermined thickness.

4. The apparatus of claim 3, further comprising at least one gauge, configured to measure the thickness around the resin film, and wherein the processor is configured to automatically control the gear motor based on the measured film thickness.

5. The apparatus of claim 4, wherein the at least one gauge comprises at least one rotating gauge.

6. The apparatus of claim 3, wherein the processor is further configured to automatically control the gear motor based on an incremental offset distributed as stochastic noise.

7. The apparatus of claim 6, wherein the stochastic noise has an average equal to zero.

8. The apparatus of claim 3, wherein the processor is configured to adjust the thickness of the resin film to be essentially uniform throughout an entire circumference of the extrusion lip.

9. The apparatus of claim 1, wherein the base ring has a circular shape having a diameter greater than a diameter of the extrusion lip and the base ring extends in a plane perpendicular to an extrusion direction of the extruded film.

10. The apparatus of claim 1, wherein the two guide protrusions extend in a direction parallel to an extrusion direction of the extruded film from the base ring.

11. The apparatus of claim 1, further comprising a mechanical joint connected between the actuation unit and the extrusion lip.

12. A system for adjusting a thickness of resin film exiting an extrusion lip of a blown film extruder, the system comprising:

the extrusion lip for the blown film extruder configured to create resin film of a predetermined thickness; and at least one apparatus for adjusting the thickness of the resin film exiting the extrusion lip, the apparatus comprising:

a gear motor configured to provide a rotational movement in either of two directions about an axis;

an actuation unit comprising at least one hinge and a rod;

a mechanical joint connected to the actuation unit and arranged to connect to the extrusion lip; and a base ring having two guide protrusions connected thereto, the actuation unit being fixedly located between the two guide protrusions, wherein the at least one hinge and the rod are connected between the gear motor and the mechanical joint along the axis, wherein the actuation unit is configured to convert the rotational movement of the gear motor into an axial movement in the direction of the axis, and wherein the actuation unit is further configured to adjust a local width of the extrusion lip by the axial movement in the direction of the axis.

* * * * *